W. H. MILLER.
Gridiron.
No. 112,479. Patented Mar. 7, 1871.
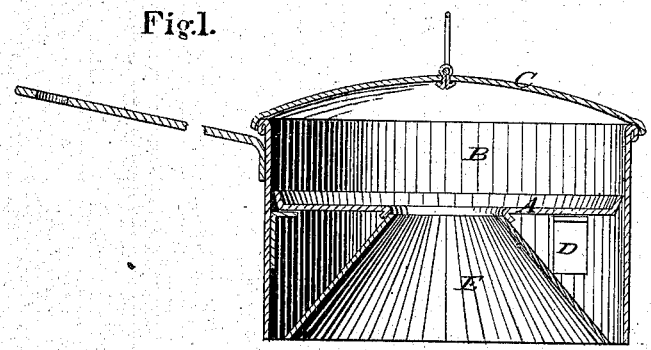
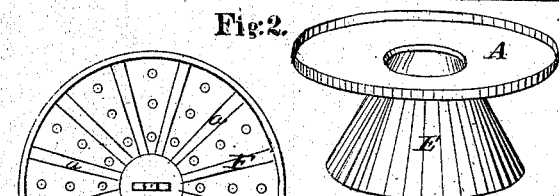
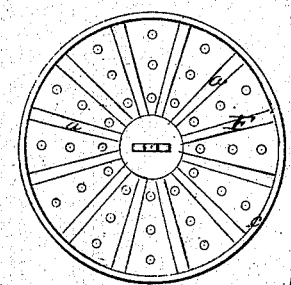
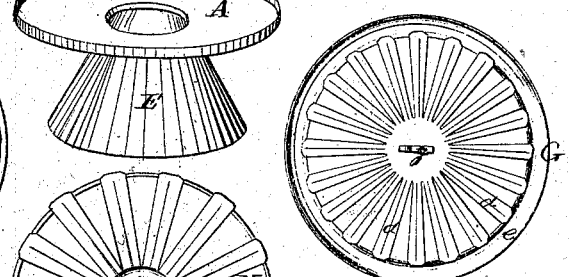
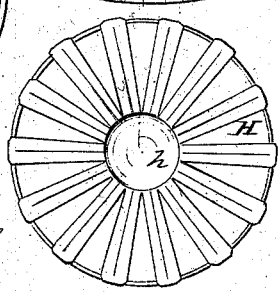
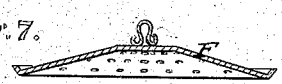
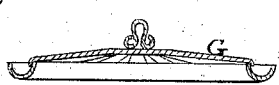
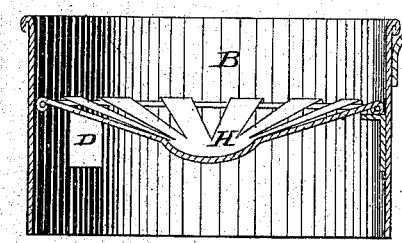
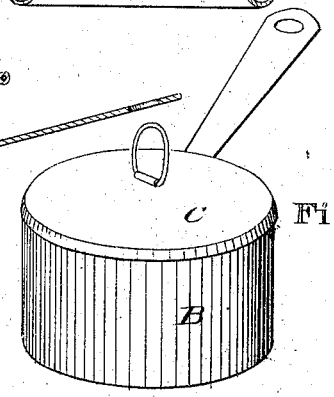
Witnesses.
Villette Anderson.
Cha. Kenyon
Inventor.
W. H. Miller,
Chipman, Hosmer & Co.,
Attorneys.

United States Patent Office.

WILLIAM H. MILLER, OF BRANDENBURG, KENTUCKY.

Letters Patent No. 112,479, dated March 7, 1871.

IMPROVEMENT IN COMBINED BAKERS AND BROILERS.

The Schedule referred to in these Letters Patent and making part of the same.

*To all whom it may concern:*

Be it known that I, WILLIAM H. MILLER, of Brandenburg, in the county of Meade and State of Kentucky, have invented a new and valuable Improvement in Combined Bakers and Broilers; and I do hereby declare that the following is a full, clear, and exact description of the construction and operation of the same, reference being had to the annexed drawing making a part of this specification, and to the letters and figures of reference marked thereon.

Figure 1 of the drawing is a representation of a central vertical section of my baker in the cylinder.

Figure 2 is a perspective view of the same detached.

Figure 3 is a central vertical section of my broiler in the cylinder.

Figures 4, 5, 6, 7, 8, 9, and 10 are details.

My invention relates to cooking-utensils, and consists in the construction and novel arrangement of a cylinder provided with a cover, and designed to support within it a broiling-gridiron or baking device, the cylinder being formed without a bottom, in order that the full heat of the fire may be admitted to the baker or broiler.

The letter A of the drawing designates my improved baking-pan, placed within the cylinder B, which is open at bottom, and closed at top by the cover C.

D D are lugs, attached to the inner wall of the cylinder, and designed to support the baking device.

The baking-pan is perforated in the center, and provided with an inverted funnel, E, tapering upward to this central opening, and designed to effect a twofold object. It gathers the heat and conveys it into the baking-chamber, where it acts directly upon the upper part of the bread therein, while, at the same time, its conformation is such that the bottom of the bread is, in a great degree, protected from the heat. Thus a more equal action is produced, and the bread becomes cooked at the top as well as the bottom without the necessity of turning it over in the pan.

F represents my perforated broiler. The perforations are made in ridges, *a a*, radiating from the center, and the hollows between these ridges serve to convey the gravy or juice to the grooved rim *c*.

G represents a convex circular broiler, made with or without a handle, *g*, and having the grooved radial bars *d d* inclined toward the circumference, in order that the juice or gravy may be conveyed to the channeled rim *e*.

H designates a concave broiler, having its radial arms or bars inclined downward toward the central cup *h*, designed to catch the gravy.

Sometimes I propose to use a second gridiron, immediately above either of those above mentioned with the grooved bars. This upper gridiron is designed to receive the meat, and its bars are made convex, so that the gravy will readily run off into the channeled bars of the lower gridiron, by which it is conveyed to the grooved rim or central cup.

Instead of attaching the grooved or hollow rim *e* to the radial bars of the broiler, I may secure it to the wall of the cylinder, and provide means for drawing it off through the cylindrical wall.

What I claim as my invention, and desire to secure by Letters Patent, is—

In combination with the centrally-perforated baking-pan A, having the downwardly-flaring funnel E, the cylinder B, open at the bottom and provided with the cover C, as and for the purposes specified.

In testimony that I claim the above I have hereunto subscribed my name in the presence of two witnesses.

W. H. MILLER.

Witnesses:
OSCAR BOARD,
A. T. RANKIN.